(12) United States Patent
Davidson et al.

(10) Patent No.: US 9,065,262 B2
(45) Date of Patent: Jun. 23, 2015

(54) FISH TAPE LEADER WITH QUICK CHANGE COUPLING

(76) Inventors: Scott Davidson, Shingle Springs, CA (US); Aleksey Neverov, West Sacramento, CA (US)

(*) Notice: Subject to any disclaimer, the term of this patent is extended or adjusted under 35 U.S.C. 154(b) by 883 days.

(21) Appl. No.: 13/248,082

(22) Filed: Sep. 29, 2011

(65) Prior Publication Data

US 2012/0080650 A1    Apr. 5, 2012

Related U.S. Application Data

(60) Provisional application No. 61/388,862, filed on Oct. 1, 2010.

(51) Int. Cl.
*H02G 1/08* (2006.01)

(52) U.S. Cl.
CPC .............. *H02G 1/081* (2013.01); *Y10T 24/3991* (2015.01); *Y10T 24/39* (2015.01); *Y10T 29/49959* (2015.01); *H02G 1/083* (2013.01)

(58) Field of Classification Search
CPC ......... H02G 1/08; H02G 1/086; H02G 1/081; H02G 1/083; H02G 1/085

USPC ...... 254/134.3 FT, 134.3 R, 134.4; 29/525.08
See application file for complete search history.

(56) References Cited

U.S. PATENT DOCUMENTS

| | | | |
|---|---|---|---|
| 1,672,324 A | 6/1928 | Kepler | |
| 1,730,993 A | 10/1929 | Buchanan et al. | |
| 2,509,100 A | 5/1950 | Jordan | |
| 2,727,720 A | 12/1955 | Barth | |
| 3,035,817 A * | 5/1962 | Wilson | 254/134.3 FT |
| 3,100,924 A | 8/1963 | Trier et al. | |
| 3,675,898 A | 7/1972 | Fattor et al. | |
| 3,858,848 A | 1/1975 | MacFetrich | |
| 4,514,005 A * | 4/1985 | Fallon | 294/86.42 |
| 6,319,618 B1 | 11/2001 | Kelley et al. | |
| 2011/0140058 A1 | 6/2011 | Pagliaroli et al. | |

* cited by examiner

*Primary Examiner* — Lee D Wilson
*Assistant Examiner* — Seahee Yoon
(74) *Attorney, Agent, or Firm* — John P. O'Banion

(57) ABSTRACT

A fish tape leader and coupling are disclosed wherein the coupling attaches to a fish tape using an adaptor that fits within the coupling and has a slot through which the fish tape can be inserted. Twisting the fish tape deforms the tape so that the tape cannot be pulled back through the adaptor and coupling.

19 Claims, 5 Drawing Sheets

FISH TAPE LEADER WITH QUICK CHANGE COUPLING

CROSS-REFERENCE TO RELATED APPLICATIONS

This application claims priority from U.S. provisional application Ser. No. 61/388,862 filed on Oct. 1, 2010, herein incorporated by reference in its entirety.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to a leader for advancing cabling through conduit, and more particularly to a leader for advancing fish tape through conduit.

2. Description of Related Art

Fish tapes are commonly used to guide cable, wire, or similar material through conduit or the like. A conventional fish tape includes a hardened metal ribbon or tape that is sufficiently resilient to be inserted into one end of a conduit and pushed so that the tape feeds through the conduit. When the end of the fish tape emerges from the opposite end of the conduit, a spool wire or other material that may be too flexible to be pushed through the conduit can be attached to the fish tape. Pulling the fish tape back through the conduit can leave wire extending through the length of the conduit.

Conventionally a leader can be attached to the end of a fish tape that is pushed through the conduit. The leader can include a spring portion that facilitates maneuvering the fish tape through elbows or bends in the conduit when the fish tape is being inserted through the conduit. The leader can also be adapted for attachment of wire or other materials that will be pulled back through the conduit.

As it is necessary to cut leaders off of the fish tape from time to time, efficient systems and methods for attaching a leader to a fish tape are desired. The process used by currently existing systems is one of two methods, both involving heat. The most commonly used method is to place the leader on the fish tape, heat the end of the fish tape with a torch to a red-hot glow, and bend a very tight loop on the end of the tape. If not heated, the tape cannot be bent tight enough to fit inside of the leader without breaking the tape. The second method is to place the leader on the tape and solder the end of the tape, thus creating a stop for the leader to rest against. Both of these systems take a substantial amount of time to install, generally between 10 and 40 minutes depending upon the availability of the tools needed to accomplish these tasks.

BRIEF SUMMARY OF THE INVENTION

The leader system of the present invention incorporates a small adaptor is placed inside of the leader, which eliminates the need for solder or a tight loop on the end of the tape. The leader is placed on the tape and the adaptor slides onto the tape and sits inside of the leader. With two pairs of pliers placed with about a ⅛" gap between them, a quarter turn (approximately a 90° twist) is bent on the end of the tape. The excess tape is then cut off to fit inside of the leader. The adaptor has a slot shaped to permit insertion of the tape when straight, but the shape of the slot prevents the adaptor from sliding off, i.e., past a twist in the tape. The installation of a fish tape line to a leader assembly of the present invention generally takes as little 8 to 15 seconds, saving time and money. The leader assembly of the present invention has undergone preliminary load testing and has been shown to sustain pressure of at least 585 lbs, which was the maximum available at the time of the test.

An aspect of the invention is a leader for advancing fish tape through conduit. The leader includes a housing having a leading end and a trailing end, wherein the leading end of the housing has an eyelet for coupling one or more lines to be routed through said conduit, and the trailing end is configured to attach to a fish tape or fish tape coupling. The leader also includes at least a first resilient elongate member having first and second ends, the first resilient being member bent to form a first resilient preformed loop, with the first and second ends attached to the leading end of the housing such that the first and second ends emanate longitudinally from the leading end of the housing. Preferably, the leader also includes a second preformed resilient loop orthogonal to the first loop. The first preformed loop extends longitudinally and laterally from the leading end of the housing to form a first curved leading edge, and has a width greater than the width of the housing. The leader is configured to be advanced in a lengthwise direction through the conduit such that the first preformed loop simultaneously contacts two substantially opposing points of an inner wall of the conduit.

Another aspect of the invention is a coupling for releasably attaching to fish tape. The coupling may be sued with the above described leader, or with other leaders. The coupling includes a base having an open end and a trailing end, wherein the open end comprises attachment means for releasably coupling a trailing end of a leader to the base, and the trailing end of the base includes an aperture for receiving an end of the fish tape, the aperture being in communication with the open end via a cavity. The coupling further includes a slotted member having a slot-shaped thru-hole with a width sized to allow the tape to advance through the slot when the tape is in a non-deformed state, yet retain an end of the fish tape from advancing past the thru-hole when the end of the fish tape is torsionally deformed, or twisted about the long axis or length of the tape.

Another aspect of the invention is a method for attaching a leader to fish tape. The method includes the steps of: providing a coupling having an open end and a trailing end; receiving an end of the fish tape through an aperture in the trailing end of the coupling; advancing an end of the fish tape through a slot-shaped thru-hole of a slotted member coupled to the coupling, the slot-shaped thru-hole having a width sized to allow the tape to advance through the slot when the tape is in a non-deformed state; applying a torsional load to the end of the tape to deform the end of the tape in a twisted shape; and releasably attaching the trailing end of a leader to open end the coupling.

Further aspects and embodiments of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

DETAILED DESCRIPTION OF THE INVENTION

Referring more specifically to the drawings, for illustrative purposes the present invention is embodied in the apparatus generally shown in FIGS. 1 through FIG. 7. It will be appreciated that the apparatus may vary as to configuration and as to details of the parts without departing from the basic concepts as disclosed herein.

Figure 1:
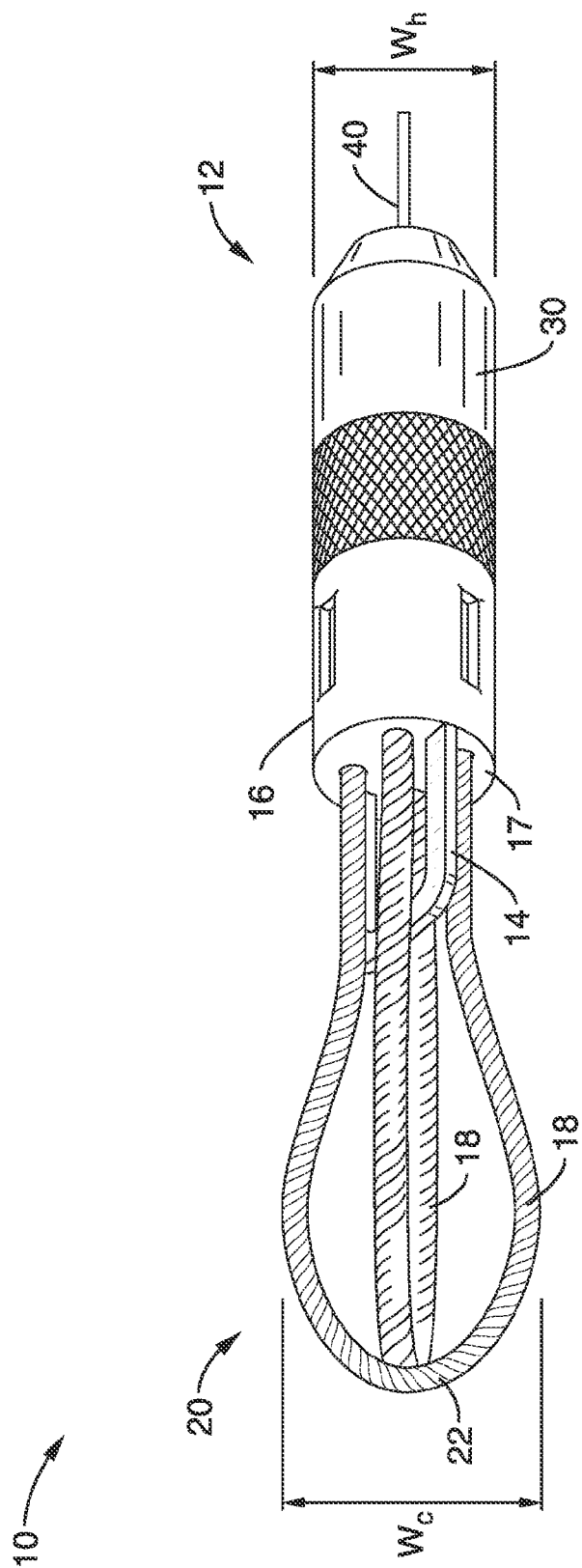
FIG. 1 illustrates an assembled view of a fish tape leader assembly and corresponding attached fish tape in accordance with the present invention.
Figure 2:
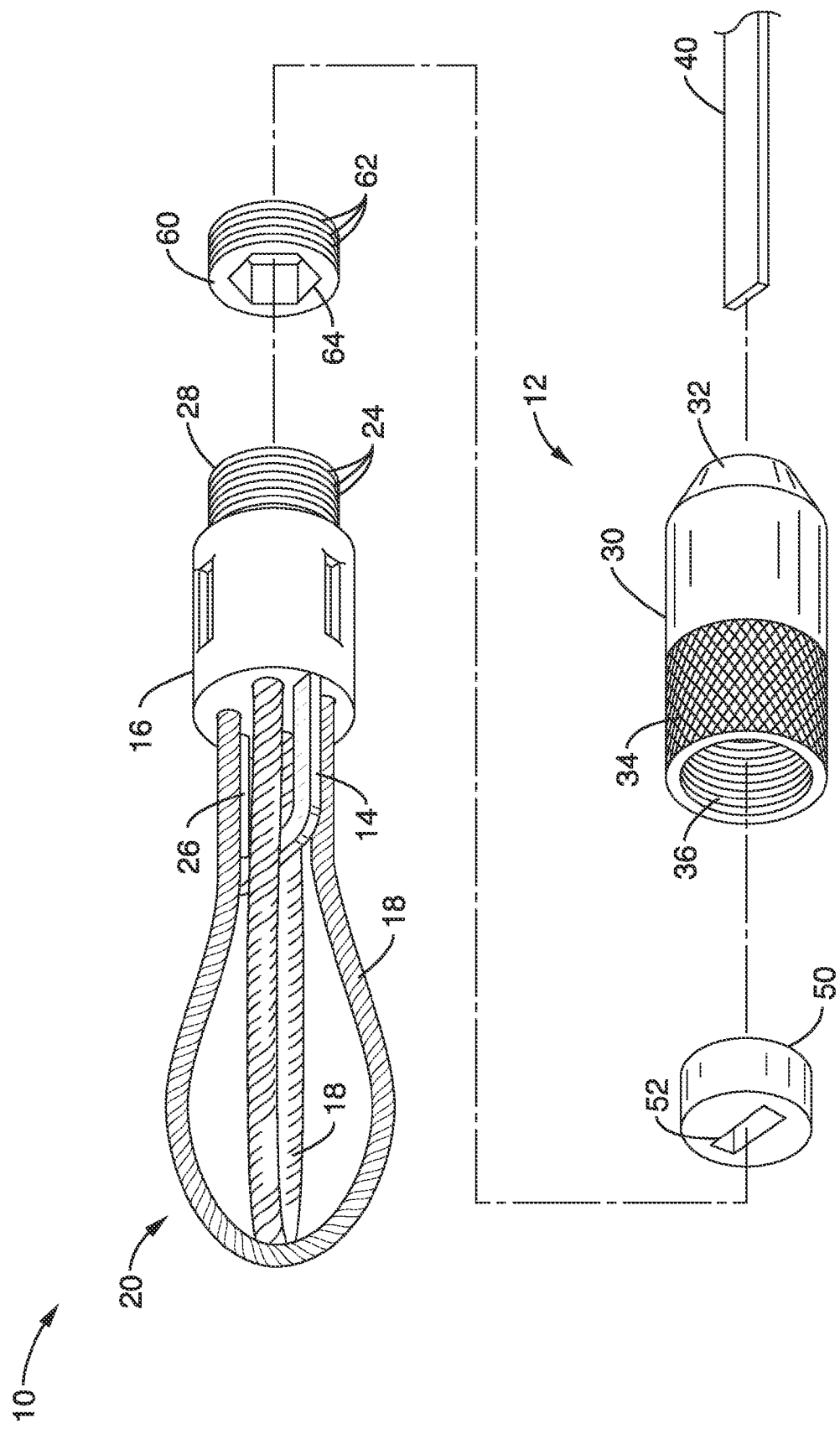
FIG. 2 shows an exploded assembly view of the fish tape leader assembly of FIG. 1.

FIG. 1 illustrates an assembled view of a fish tape leader assembly 10 of the present invention and corresponding attached fish tape 40. Leader assembly 10 is also shown in exploded view in FIG. 2. Fish tape leader assembly 10 comprises a leader 20 that releasably threads into a bullet-shaped coupling assembly 12.

An end of a fish tape 40 is shown attached to the coupling assembly 12. Tape 40 is inserted through a receiving end 32 of base 30 of coupling assembly 12. Tape 40 is generally a hardened or tempered steel tape that is 50 to 100 feet or more in length and typically about ⅛ inch wide and about 0.060 inch thick. It is appreciated that the leader assembly 10 may be sized to accommodate tapes having other dimensions and materials.

Figure 6:
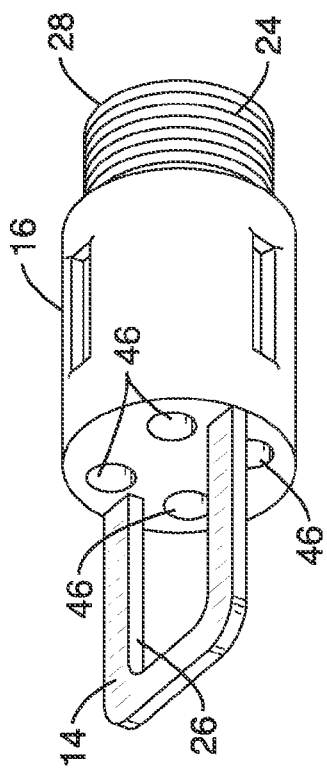
FIG. 6 is a perspective view of the leader housing in accordance with the present invention.

Leader 20 comprises a pair of looped elongate resilient members 18 (e.g. cable, wire, or the like) that provide a deformable, rounded leading edge for snaking the leader assembly 10 through conduit. Cables 18 are retained at their ends axially into leader housing 16, such that they bow outward toward the leading edge 22 in a tear-drop shape. The cables 18 are retained orthogonally with respect to each other to form a bend having a lateral projection outward in both directions from the central axis of the leader assembly 10. Referring also to FIG. 6, the leader housing 16 comprises four holes 46 for retaining the ends of cables 18, such that the cables 18 extend axially or longinitudinally from the leading end 17 of the housing 16. The cables 18 are then locked into the holes 46 by crimping the body of the housing 16 onto the cables 18. The leader housing 16 further comprises an eyelet 14 at leading end 17 having a retaining hole 26 for coupling/tying ends of one or more lines (e.g. cables/wiring (not shown) to be routed).

FIGS. 3A through 5 illustrate the attachment of the tape 40 to the coupling assembly 12. As shown in FIG. 4A, a free end 42 of tape 40 is advanced through the aperture 36 of the tapered end 32 of the coupling base 30, through the slotted hole 52 of the bead 50 and the hex hole 62 of the retainer. Aperture 36 is generally a circular hole, and extends the length of the base to open end 34. The circular geometry of aperture 36 allows the tape to swivel with respect to the base.

The bead 50 is preferably installed in cavity 37 of the base 30 prior to inserting the tape 40. A retainer ring 60 retains the bead within the cavity 37. Retainer ring 60 comprises threads 62 that mate with internal threads 38 of the base, and has a hexagonal through hole 64 sized to allow the tape 40 to pass through it, as well as tightening of the retainer 60 so that it seats at the end 35 of threads 38.

Figure 4A:
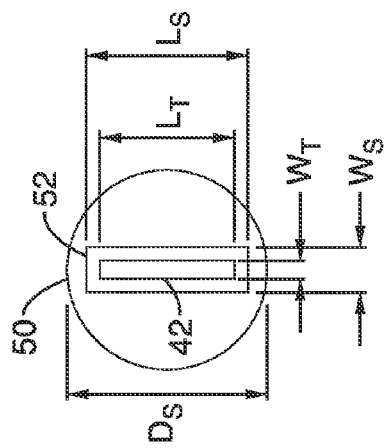
FIG. 4A is a top view of the fish tape coupling assembly shown in FIG. 3A.

As seen in FIG. 4A (retainer 60 not shown for clarity), the slot 52 of bead 50 has a length $L_s$ and width $W_s$ sized to be slightly larger than the width $W_T$ and $L_T$ so that the end 42 of the tape 40 can slide through the slot when being installed. In one embodiment, the tape 40 has a length of ⅛ inch and width $W_T$ of about 0.060 inch. In general, the size and shape of bead 50 and slot 52 will depend on the size of the fish tape 40 and the size of the interior of the coupling base 30 in which bead 50 fits.

Referring now to FIG. 4A, the end 42 of tape 40 is twisted, i.e. a torsional force is applied at the end 42 about the long axis or length of the tape via pliers or other tooling, to deform the end 42 about one quarter turn (e.g. 90 degrees). The twisting or deformation of the tape can be performed while the tape 40 is cold (e.g., room temperature) without breaking the tape. The slot 52 in bead 50 is sized so that the twisted end 42 of tape 40 cannot slide back through the bead (e.g. when being pulled). Similarly, the outer diameter $D_s$ of bead 50 is sized so that the bead 50 cannot slide through the aperture 36 at the tapered end 32 of coupling base 30.

Figure 4B:
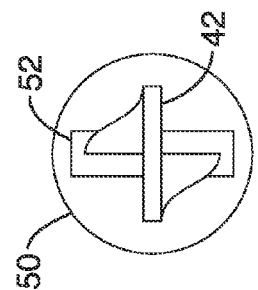
FIG. 4B is a top view of the fish tape coupling assembly shown in FIG. 3B.
Figure 3A:
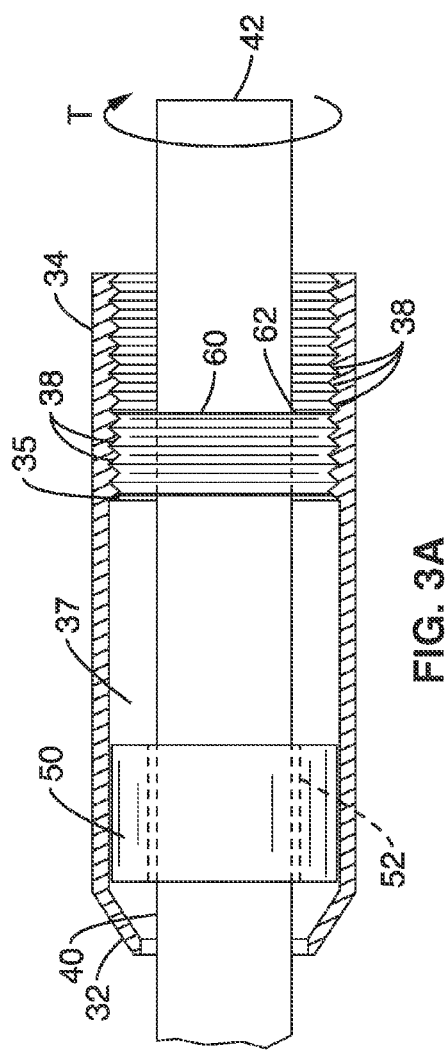
FIG. 3A shows a cross-sectional view of the fish tape coupling assembly with fish tape fed through in accordance with the present invention.
Figure 3B:
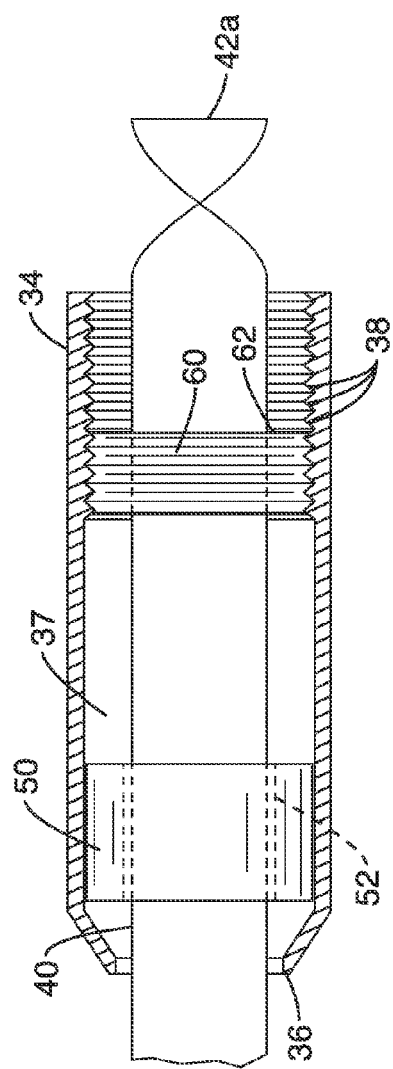
FIG. 3B shows a cross-sectional view of the fish tape coupling assembly with fish tape in twisted configuration in accordance with the present invention.

As shown in FIG. 4B, the twisted shape of the tip 42a of the tape is restricted from passing back through the slot 52 of the bead 50.

Figure 5:
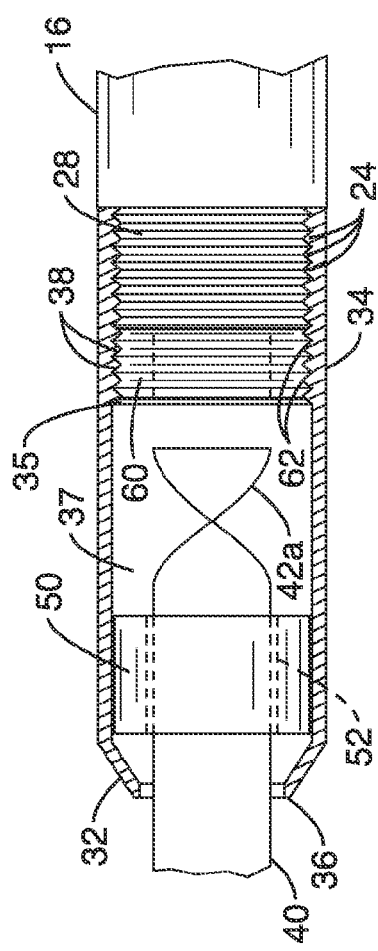
FIG. 5 shows a cross-sectional view of the fish tape coupling assembly assembled to the fish tape leader assembly in accordance with the present invention.

Referring now to FIG. 5, the end 42A is pulled through the hex hole 62 of the retainer 60, and then the threaded trailing end 28 of leader housing 16 is threaded into the open end 34 of base 30. Internal threads 38 match the threads 24 of housing 16 (see FIG. 6). End 28 of housing 16 now closes the free end 34 of the base 30 such that a pushing motion on the tape 40 is transferred into the leader assembly 20.

Other materials, shapes, and dimensions can be used in place of the adaptor 50 in accordance with other embodiments of the invention. It is appreciated that while the bead 50 is shown as cylinder in the present description, it may also comprise different shapes if desired.

Furthermore, retainer 60 may also comprise different configurations for securing the bead within cavity 37. For example, instead of being threaded, the retainer 60 may simply be a snap ring, or a hollow dowel press fit into the cavity 37 (e.g. via an internal surface having a diameter smaller than threads 38, not shown).

The attachment means (e.g. male 24 and female 38 threaded interface) between the leader housing 16 and the coupling base 30 may also comprise other attachment or quick release means available in the art. For example, the end 28 may comprise a smooth or grooved boss, such that it is received in open end 34 of the base 30 and then secured with one or more set screws running radially into the base. (not shown)

In an alternative embodiment, aperture 36 of base 30 may be slot (not shown) rather than a circular hole. The slot would have similar dimensions to slot 52 of bead 50. This configuration would eliminate the need for the bead 50 and retainer 60. While this beneficially makes for a more simplistic design, it lacks the swiveling feature that the bead 50 provides in the device shown in FIGS. 1-6 (i.e. the leader assembly 10 is allowed to swivel with respect to the tape 40 when the bead 50 is used).

To detach a fish tape 40 assembled to the coupling 12, the tape may either be cut just prior to tapered end 32, or the tape may be advanced through open end 34, untwisted (e.g. with pliers or the like), and pulled back through aperture 36.

Figure 7:
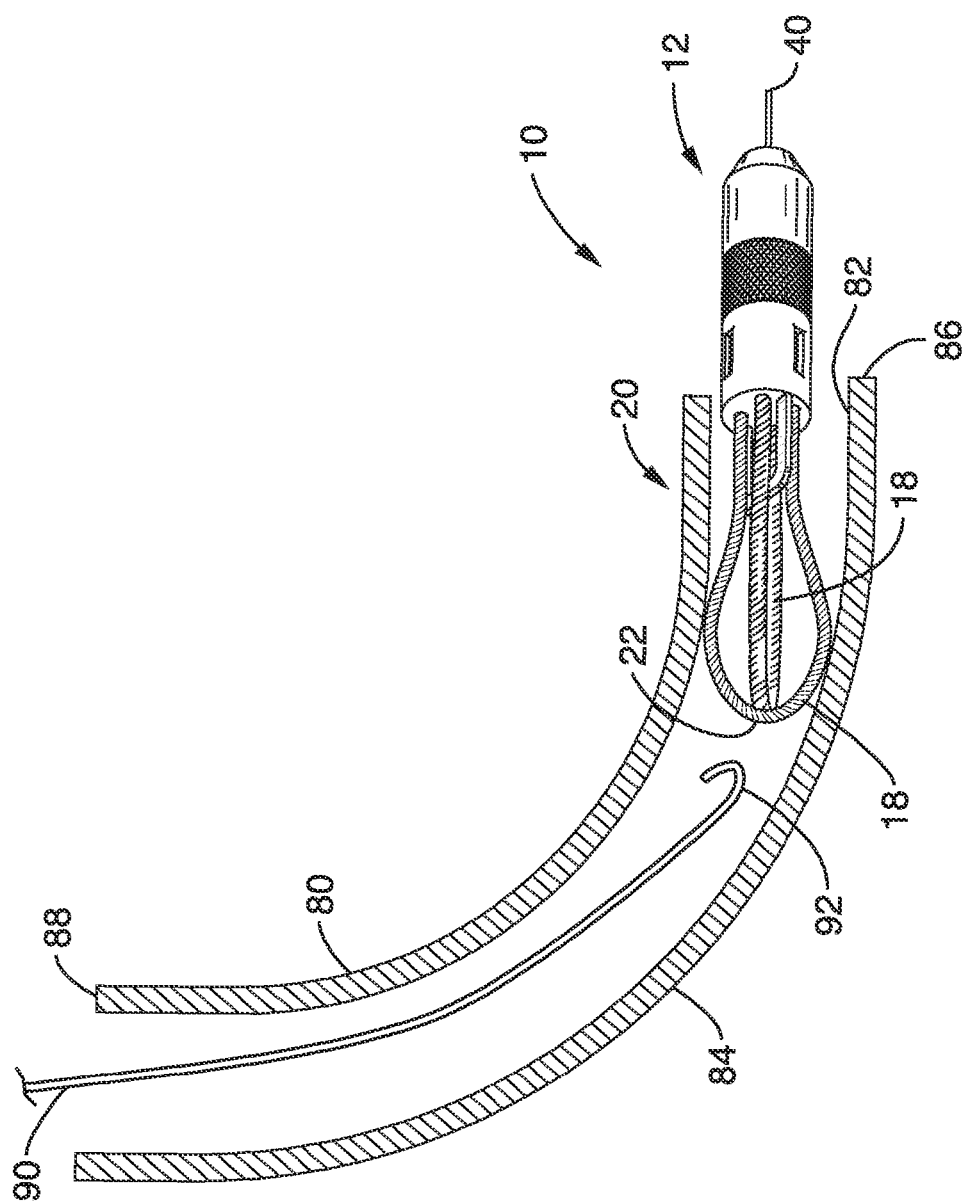
FIG. 7 is a side view of the fish tape leader assembly of the present invention being drawn through a conduit in accordance with the present invention.

Referring now to FIG. 7, the cable 18 and housing 16 configurations provide a number of beneficial features for feeding assembly 10 and routing cables/wiring through conduit. First, the deformable rounded shape of the cables 18 acts a highly efficient leading edge 22 for pushing and/or pulling the leader assembly 10 through conduit 80, particularly around corners 84 or uneven surfaces within the conduit 80. The loops of the cables 18 are configured to interface with the internal wall 82 of the conduit 80, so that each loop 18 contacts the inner surface 82 of the conduit 80 at two opposing points, with both loops generally contacting the wall at four spaced apart points (e.g. at 90 degree increments), and thereby center the leader assembly 10 within the conduit 80 while the assembly is being advanced within the conduit. The centering action helps to keep the housing 16 away from the walls 82 of the conduit, where the potential for snagging on a feature of the conduit (e.g. couplings, curves, etc.) is highest.

The cables 18 are sized (e.g. length, wire gauge, etc.) so that the loop has a width $W_c$ at its widest point as large as, and preferably larger than, the inner diameter of the conduit wall 82. The loop width $W_c$ is also wider than the diameter or width $W_h$ of the housing 16. This ensures that the leader assembly 10 is centered while travelling in a lengthwise direction through the conduit 80, and minimizes snags that may impede the progress of the device. It is appreciated that the cables are resiliently deformable to accommodate different sized conduit. However, the cables 18 and housing 16 may be sized for use within a specific sized conduit or range of conduits (e.g. one size for ½" to ¾" conduit, another size for 1" to 1½" conduit, etc.). Generally, the diameter of the housing $W_h$ and length of the cables 18 are increased accordingly to generate a larger loop width $W_c$.

The gauge of the cables 18 may be selected to determine that ease or resistance to bending/deformation as a result of insertion into a conduit and navigating the internal features of the conduit. For example, as the leading edge 22 approaches a curve 84 in the conduit 80, the force being used to push the leader assembly past the curve 84 will tend to deform the cables 18 to conform at least in part to the contour of the curve 84. Thus, instead of having a sharp or single-point edge contact with the internal wall 82, the leading edge 22 and cables 18 will have multiple points of contact that disperse the load being applied, and thus minimize the possibility of snagging on a surface.

Second, if the leader assembly 10 does happen to snag or get caught on an internal feature of the conduit, the leading-edge loop configuration provides a contact point for retrieving/releasing the leading edge 22 from the opposite direction within the conduit from the end 86 of conduit that the leader assembly 10 is being advanced from. In this situation, a retrieval device 90 may be advanced from the opposite end 88 (e.g. the end of the conduit where the leader assembly 10 is desired to be advanced), hook one or more of the cable 18 loops with distal end 92, and pull the leader assembly 10 away from the impeding internal structure (e.g. curve 84 or other internal surface).

The coupling assembly 12 and leader 20 are preferably used as a system 10 as shown in FIG. 1. However, it is appreciated that each may be used individually to enhance the functionality of other devices. For example, the leader 20 of the present invention may be threaded into an existing coupling to enhance the mobility of that device through conduit. Correspondingly, the coupling assembly 12 may be attached to any existing leader to improve the time and safety in changing out leaders or tape.

From the discussion above it will be appreciated that the invention can be embodied in various ways, including the following:

1. A leader for advancing fish tape through conduit, comprising; a housing having a leading end, trailing end and length therebetween; the leading end of the housing having an eyelet for coupling one or more lines to be routed through said conduit; the trailing end being configured to attach to a fish tape or fish tape coupling; and a first resilient elongate member having first and second ends; wherein the first resilient elongate member is bent to form a first resilient preformed loop, with the first and second ends attached to the leading end of the housing such that the first and second ends emanate longitudinally from the leading end of the housing; wherein the first preformed loop extends longitudinally and laterally from the leading end of the housing to form a first curved leading edge, the first preformed loop having a width greater than the width of the housing; and wherein the leader is configured to be advanced in a lengthwise direction through the conduit such that the first preformed loop simultaneously contacts two substantially opposing points of an inner wall of the conduit.

2. The leader of embodiment 1, further comprising: a second resilient elongate member having first and second ends; wherein the second resilient elongate member is bent to form a second resilient preformed loop, with the first and second ends attached to the leading end of the housing such that the first and second ends emanate longitudinally from the leading end of the housing; wherein the second preformed loop extends longitudinally and laterally from the leading end of the housing to form a second curved leading edge substantially orthogonal to the first leading edge, the second preformed loop having a width greater than the width of the housing; and wherein the leader is configured to be advanced in a lengthwise direction through the conduit such that the second preformed loop simultaneously contacts two substantially opposing points of the inner wall of the conduit.

3. The leader of embodiment 2, wherein the first and second preformed loops have widths sized to be greater than the diameter of the inner wall of the conduit such that the first and second preformed loops are configured to resiliently deform to accommodate the shape of the inner wall while being inserted into the conduit.

4. The leader of embodiment 2, wherein the first and second preformed loops are configured to provide an anchor point to allow the leader to be pulled from an opposite direction within the conduit.

5. The leader of embodiment 1, further comprising: a coupling releasably attached to the trailing end of the housing; wherein the coupling comprises a slotted member; the slotted member having a slot-shaped thru-hole having a width sized to allow the tape to advance through the slot when the tape is in a non-deformed state; the thru-hole further sized to retain an end of the fish tape from advancing past the thru-hole when the end of the fish tape is torsionally deformed about the length of the tape.

6. The leader of embodiment 5, wherein the coupling comprises: a base having an open end and a trailing end; wherein the open end comprises attachment means for releasably coupling the trailing end of the housing to the base; the trailing end of the base comprising an aperture for receiving the end of the fish tape, the aperture being in communication with the open end via a cavity; wherein the slotted member comprises a bead comprising the slot-shaped thru-hole; and wherein the aperture is sized to retain the bead from advancing out of the cavity past the aperture.

7. The leader of embodiment 6, wherein the bead is configured to allow the fish tape to swivel within the cavity with respect to the base and housing.

8. The leader of embodiment 5, wherein the coupling comprises: a base having an open end and a trailing end; wherein the open end comprises attachment means for releasably coupling the trailing end of the housing to the base; the trailing end of the base comprising an aperture for receiving the end of the fish tape, the aperture being in communication with the open end via a cavity; wherein the aperture is slotted to form the slot-shaped thru-hole.

9. A coupling for releasably attaching to fish tape: a base having an open end and a trailing end; wherein the open end comprises attachment means for releasably coupling a trailing end of a leader to the base; the trailing end of the base comprising an aperture for receiving an end of the fish tape, the aperture being in communication with the open end via a cavity; and a slotted member; the slotted member having a slot-shaped thru-hole having a width sized to allow the tape to advance through the slot when the tape is in a non-deformed state; the thru-hole further sized to retain an end of the fish tape from advancing past the thru-hole when the end of the fish tape is torsionally deformed about an axis corresponding to the length of the tape.

10. The coupling of embodiment 9, wherein the slotted member comprises a bead comprising the slot-shaped thru-hole; and wherein the aperture is sized to retain the bead from advancing out of the cavity past the aperture.

11. The coupling of embodiment 10, further comprising: a retainer for retaining the bead from advancing past the open end of the base.

12. The coupling of embodiment 10, wherein the bead is configured to allow the fish tape to swivel within the cavity with respect to the base and housing.

13. The coupling of embodiment 9: wherein the slotted member comprises the aperture; and wherein the aperture is slotted to form the slot-shaped thru-hole.

14. The coupling of embodiment 9, further comprising: a leader releasably coupled to the open end of the base, the leader comprising: a housing having a leading end, trailing end and length therebetween; the leading end of the housing having an eyelet for coupling one or more lines to be routed through said conduit; the trailing end being configured to attach to a fish tape or fish tape coupling; and a first resilient elongate member having first and second ends; wherein the first resilient elongate member is bent to form a first resilient preformed loop, with the first and second ends attached to the leading end of the housing such that the first and second ends emanate longitudinally from the leading end of the housing; wherein the first preformed loop extends longitudinally and laterally from the leading end of the housing to form a first curved leading edge, the first preformed loop having a width greater than the width of the housing; and wherein the leader is configured to be advanced in a lengthwise direction through the conduit such that the first preformed loop simultaneously contacts two substantially opposing points of an inner wall of the conduit.

15. The coupling of embodiment 14, the leader further comprising: a second resilient elongate member having first and second ends; wherein the second resilient elongate member is bent to form a second resilient preformed loop, with the first and second ends attached to the leading end of the housing such that the first and second ends emanate longitudinally from the leading end of the housing; wherein the second preformed loop extends longitudinally and laterally from the leading end of the housing to form a second curved leading edge substantially orthogonal to the first leading edge, the second preformed loop having a width greater than the width of the housing; and wherein the leader is configured to be advanced in a lengthwise direction through the conduit such that the second preformed loop simultaneously contacts two substantially opposing points of the inner wall of the conduit.

16. The coupling of embodiment 15, wherein the first and second preformed loops have widths sized to be greater than the diameter of the inner wall of the conduit such that the first and second preformed loops are configured to resiliently deform to accommodate the shape of the inner wall while being inserted into the conduit.

17. The coupling of embodiment 15, wherein the first and second preformed loops are configured to provide an anchor point to allow the leader to be pulled from an opposite direction within the conduit.

18. A method for attaching a leader to fish tape, comprising: providing a coupling having an open end and a trailing end; receiving an end of the fish tape through an aperture in the trailing end of the coupling; advancing an end of the fish tape through a slot-shaped thru-hole of a slotted member coupled to the coupling, the slot-shaped thru-hole having a width sized to allow the tape to advance through the slot when the tape is in a non-deformed state; applying a torsional load to the end of the tape to deform the end of the tape in a twisted shape; and releasably coupling the trailing end of a leader to open end the coupling.

19. The method of embodiment 18, further comprising: installing a retainer for retaining the slotted member from advancing past the open end of the coupling.

20. The method of embodiment 19, wherein the slotted member is retained in a cavity of said coupling via said retainer prior to receiving the fish tape. Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A leader for advancing fish tape through conduit, comprising:
   a housing having a leading end, trailing end and length therebetween;
   the leading end of the housing having an eyelet for coupling one or more lines to be routed through said conduit;
   the trailing end being configured to attach to a fish tape or fish tape coupling; and
   a first resilient elongate member having first and second ends;
   wherein the first resilient elongate member is bent to form a first resilient preformed loop, with the first and second ends attached to the leading end of the housing such that the first and second ends emanate longitudinally from the leading end of the housing;
   wherein the first preformed loop extends longitudinally and laterally from the leading end of the housing to form a first curved leading edge, the first preformed loop having a width greater than the width of the housing;
   a second resilient elongate member having first and second ends;
   wherein the second resilient elongate member is bent to form a second resilient performed loop, with the first and second ends attached to the leading end of the housing such that the first and second ends emanate longitudinally from the leading end of the housing;
   wherein, while the first and second preformed loops are in an unloaded state, the second preformed loop extends longitudinally and laterally from the leading end of the housing to form a second curved leading edge substantially orthogonal to the first leading edge, the second preformed loop having a width greater than the width of the housing; and
   wherein the leader is configured to be advanced in a lengthwise direction through the conduit such that the first preformed loop and second preformed loop each simultaneously contact two substantially opposing points of an inner wall of the conduit.

2. The leader recited in claim 1, wherein the first and second preformed loops have shapes and widths sized to be greater than the diameter of the inner wall of the conduit such that the first and second preformed loops are configured to resiliently deform to accommodate the shape of the inner wall while being inserted into the conduit.

3. The leader recited in claim 1, wherein the first and seconds ends of each of the first and second preformed loops are disposed within the housing at spaced-apart locations to form the substantially orthogonal curved leading edges; and
   wherein the first and second preformed loops are configured to provide an anchor point to allow the leader to be pulled from an opposite direction within the conduit.

4. The leader recited in claim 1, further comprising:
   a coupling releasably attached to the trailing end of the housing;
   wherein the coupling comprises a slotted member;
   the slotted member having a slot-shaped thru-hole having a width sized to allow the tape to advance through the thru-hole when the tape is in a non-deformed state;
   the thru-hole further sized to retain an end of the fish tape from advancing past the thru-hole when the end of the fish tape is torsionally deformed about the length of the tape.

5. The leader recited in claim 4, wherein the coupling comprises:
   a base having an open end and a trailing end;
   wherein the open end comprises attachment means for releasably coupling the trailing end of the housing to the base;
   the trailing end of the base comprising an aperture for receiving the end of the fish tape, the aperture being in communication with the open end via a cavity;
   wherein the slotted member comprises a bead comprising the slot-shaped thru-hole; and
   wherein the aperture is sized to retain the bead from advancing out of the cavity past the aperture.

6. The leader recited in claim 5, wherein the bead is configured to allow the fish tape to swivel within the cavity with respect to the base and the housing.

7. The leader recited in claim 4, wherein the coupling comprises:
   a base having an open end and a trailing end;
   wherein the open end comprises attachment means for releasably coupling the trailing end of the housing to the base;
   the trailing end of the base comprising an aperture for receiving the end of the fish tape, the aperture being in communication with the open end via a cavity;
   wherein the aperture is slotted to form the slot-shaped thru-hole.

8. An apparatus for releasably attaching to fish tape, comprising:
   a base having an open end and a trailing end;
   wherein the open end comprises attachment means for releasably coupling a trailing end of a leader to the base;
   the trailing end of the base comprising an aperture for receiving an end of the fish tape, the aperture being in communication with the open end via a cavity; and
   a slotted member;
   the slotted member having a slot-shaped thru-hole having a slot length significantly larger than a slot width and corresponding to a length and width of the fish tape, and sized to allow the tape to advance through the thru-hole when the tape is in a non-deformed state;
   the thru-hole further shaped and sized to retain an end of the fish tape from advancing past the thru-hole when the end of the fish tape is torsionally deformed about an axis orthogonal to the cross-section of the tape.

9. The apparatus as recited in claim 8, wherein the slotted member comprises a bead comprising the slot-shaped thru-hole; and
   wherein the aperture is sized to retain the bead from advancing out of the cavity past the aperture.

10. The apparatus recited in claim 9, further comprising:
    a retainer for retaining the bead from advancing past the open end of the base.

11. The apparatus recited in claim 9, wherein the bead is configured to allow the fish tape to swivel within the cavity with respect to the base and a housing.

12. The apparatus recited in claim 8:
wherein the slotted member comprises the aperture; and
wherein the aperture is slotted to form the slot-shaped thru-hole.

13. The apparatus recited in claim 8, further comprising:
a leader releasably coupled to the open end of the base, the leader comprising:
 a housing having a leading end, trailing end and length therebetween;
 the leading end of the housing having an eyelet for coupling one or more lines to be routed through said conduit;
 the trailing end being configured to attach to a fish tape or fish tape coupling; and
 a first resilient elongate member having first and second ends;
 wherein the first resilient elongate member is bent to form a first resilient preformed loop, with the first and second ends attached to the leading end of the housing such that the first and second ends emanate longitudinally from the leading end of the housing;
 wherein the first preformed loop extends longitudinally and laterally from the leading end of the housing to form a first curved leading edge, the first preformed loop having a width greater than the width of the housing; and
 wherein the leader is configured to be advanced in a lengthwise direction through the conduit such that the first preformed loop simultaneously contacts two substantially opposing points of an inner wall of the conduit.

14. The apparatus recited in claim 13, the leader further comprising:
a second resilient elongate member having first and second ends;
wherein the second resilient elongate member is bent to form a second resilient preformed loop, with the first and second ends attached to the leading end of the housing such that the first and second ends emanate longitudinally from the leading end of the housing;
wherein, while the first and second preformed loops are in an unloaded state, the second preformed loop extends longitudinally and laterally from the leading end of the housing to form a second curved leading edge substantially orthogonal to the first leading edge, the second preformed loop having a width greater than the width of the housing; and
wherein the leader is configured to be advanced in a lengthwise direction through the conduit such that the second preformed loop simultaneously contacts two substantially opposing points of the inner wall of the conduit.

15. The apparatus recited in claim 14, wherein the first and second preformed loops have shapes and widths sized to be greater than the diameter of the inner wall of the conduit such that the first and second preformed loops are configured to resiliently deform to accommodate the shape of the inner wall while being inserted into the conduit.

16. The apparatus recited in claim 14, wherein the first and second preformed loops are configured to provide an anchor point to allow the leader to be pulled from an opposite direction within the conduit.

17. A method for attaching a leader to fish tape, comprising:
providing a coupling having an open end and a trailing end;
receiving an end of the fish tape through an aperture in the trailing end of the coupling;
advancing an end of the fish tape through a slot-shaped thru-hole of a slotted member coupled to the coupling, the slot-shaped thru-hole having a slot length significantly larger than a slot width and corresponding to a length and width of the fish tape, and sized to allow the tape to advance through the thru-hole when the tape is in a non-deformed state;
applying a torsional load to the end of the tape to deform the end of the tape in a twisted shape; and
releasably attaching the trailing end of a leader to open end the coupling.

18. The method recited in claim 17, further comprising:
installing a retainer for retaining the slotted member from advancing past the open end of the coupling.

19. The method recited in claim 18, wherein the slotted member is retained in a cavity of said coupling via said retainer prior to receiving the fish tape.

* * * * *